UNITED STATES PATENT OFFICE.

WALTER D. FIELD, OF WYOMING, NEW JERSEY.

MANUFACTURE OF VARNISH.

SPECIFICATION forming part of Letters Patent No. 504,064, dated August 29, 1893.

Application filed January 14, 1893. Serial No. 458,395. (No specimens.)

*To all whom it may concern:*

Be it known that I, WALTER D. FIELD, a citizen of the United States, residing at Wyoming, in the county of Essex and State of New Jersey, have invented certain new and useful Improvements in the Manufacture of Varnish; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Spirit varnishes are usually made from shellac or other resins or gum resins by dissolving the shellac or other resins forming the base of the varnish in some alcoholic menstruum that is a solvent of the shellac or other resins used, after which solution the varnish is ready for use and is applied in the usual manner. The difficulties with varnishes made in this manner have been, that with the exception of shellac, the gum resins used as a base have rendered the varnish soft, and therefore have not produced good varnishes, and when shellac has been used as a base the wax and other impurities of the shellac which were not dissolved by the solvent used and remained in the solution in an undissolved state, made the varnish rough and speckled, and deprived it to some extent of its luster, and also to a certain extent rendered the varnish soft. The presence of these impurities also had a tendency when the varnish was used on light colored wood, to cause the wood to turn yellow.

It has been the object of my experiment to discover some practical method of clearing a solution of shellac from these impurities, and of producing a clear, pure and concentrated solution of shellac, which could be either used as a varnish itself or as a constituent in the manufacture of other varnishes. I have discovered by a series of experiments that the wax which is the principal and most deleterious impurity of the shellac, and many other impurities of the shellac which remain unaffected by the solvent of the shellac, are soluble in other menstrua than, and which are antagonistic to, or immiscible with the solvent of the shellac forming the base of the varnish, and that if the solvent of the wax and other impurities be added to the solution of the shellac and then thoroughly agitated so as to bring the solvent of the wax and other impurities into intimate contact with the particles of undissolved matter in the solution, that the wax and other soluble impurities will be undissolved and then that if the compound be allowed to stand at a temperature of about 30° to 35° centigrade the solvent of the shellac and the solvent of the wax and other impurities will separate, the solvent of the wax and other impurities carrying with it all these soluble impurities and leaving a pure solution of shellac behind.

In practicing my invention, I first finely grind the shellac, and then dissolve the ground shellac in any alcoholic solvent of the shellac used as a base of the varnish in the proportion of about five pounds of shellac to one gallon of the alcoholic menstruum used, and then permit the mixture to stand until the shellac has been thoroughly dissolved; I then introduce into the solution a solvent of the wax and other soluble impurities of the shellac used, which is immiscible with or antagonistic to the solvent of the shellac to an amount equal to the alcohol used as a solvent of the shellac, and I then thoroughly agitate the compound. After agitation I permit the compound to stand until the solvent of the wax and other impurities, has separated itself from the solvent of the shellac, which will be from one to two weeks according to the size of the batch made, and the thickness of the solution taking more time to separate than a small batch or thin solution. During the time that the compound is separating, I am careful to keep its temperature at between 30° and 35° centigrade as a temperature lower will hinder a separation, and a temperature higher than that causes the solvents to volatilize too rapidly. After a complete separation of the two liquids has taken place, I draw off the alcoholic solution of the shellac which is then a beautiful, pure, clear and concentrated solution, and fit to be used as a varnish or in the manufacture of other varnishes.

In practice I have found the following receipt a very useful one, viz: To one hundred gallons of methyl alcohol, I add five hundred pounds of shellac, garnet, orange or bleached, and permit the compound to stand until the gum is thoroughly dissolved, and then add to it one hundred gallons of benzine (petroleum naphtha 62° Baumé), and thoroughly agitate the compound and then permit the whole mixture to stand at a temperature of from 30° to 35° centigrade until the benzine with the impurities in solution has separated from the methyl alcohol with the shellac in solution, in this case about two weeks, and then draw off the shellac solution leaving the benzine solution in a vessel. Instead of methyl alcohol; ethyl alcohol, propyl alcohol, isopropyl alcohol, butyl alcohol or iso-butyl alcohol may be used in this receipt with good results. But it will be understood that this is merely given as an example and not as limiting the invention to the use of the solvents mentioned.

I therefore claim as my invention and desire to secure by Letters Patent—

1. The process of making a cleared shellac solution herein described, consisting in dissolving the shellac in an alcoholic solvent, adding a solvent of the soluble impurities immiscible with the alcoholic solvent, subjecting the compound to a temperature of not less than 30° centigrade and separating the alcoholic solution from the compound, as and for the purpose set forth.

2. The process of producing pure, clear and concentrated solutions of shellac consisting in dissolving the shellac in any alcoholic solvent thereof, then adding to the solution a solvent of the soluble impurities of the shellac immiscible with the alcoholic solvent, permitting the compound to stand at a temperature not lower than 30° centigrade until the liquids have separated, and then drawing off the alcoholic solution, substantially as described.

In testimony whereof I affix my signature in presence of two witnesses.

WALTER D. FIELD.

Witnesses:
J. D. GALLAGHER,
A. E. BENNETT.